United States Patent
Kim et al.

[11] Patent Number: 6,067,333
[45] Date of Patent: May 23, 2000

[54] ADAPTIVE SERIAL AND PARALLEL MIXED INTERFERENCE CANCELLATION METHOD

[75] Inventors: Seong Rag Kim; Jeong Goo Lee; Nam Jin Park; Hun Lee, all of Daejon-shi, Rep. of Korea

[73] Assignee: Electronics and Telecommunications Research Institute, Daejon-Shi, Rep. of Korea

[21] Appl. No.: 08/977,826

[22] Filed: Nov. 25, 1997

[30] Foreign Application Priority Data

Dec. 21, 1996 [KR] Rep. of Korea ................. 96-69401

[51] Int. Cl.[7] ............... H03D 1/04; H03K 5/01; H03K 6/04; H04L 25/08

[52] U.S. Cl. ............... 375/346; 370/320; 370/342; 375/349

[58] Field of Search ............... 375/316, 346, 375/349, 350, 200; 370/310, 320, 342, 335, 441, 479

[56] References Cited

U.S. PATENT DOCUMENTS

| 5,740,208 | 4/1998 | Hulbert et al. ............ 375/346 |
| 5,872,540 | 2/1999 | Casabona et al. ............ 342/362 |
| 5,872,776 | 2/1999 | Yang ............ 370/342 |
| 5,930,229 | 7/1999 | Yoshida et al. ............ 370/203 |

OTHER PUBLICATIONS

Pulin Patel and Jack Holtzman, Analysis of a Simple Successive Interference Cancellation Scheme in a DS/CDMA System, Jun. 1994, pp. 796–807.

*Primary Examiner*—Chi H. Pham
*Assistant Examiner*—Bryan Webster
*Attorney, Agent, or Firm*—Cohen, Pontani, Lieberman & Pavane

[57] ABSTRACT

The present invention relates to a CDMA system, which, in part, uses serial and parallel interference cancellation methods to overcome disadvantages of a method of detecting single user, and comprises a feedback loops for providing reproduced signals to respective inputs of detectors, and a means for controlling an operation for the detectors to attribute to interference cancellation process. The detectors to contribute to interference cancellation process can be also selected group by group. It is used to switch off only detectors contributing to interference cancellation process in progress and detectors contributing to previous interference cancellation, providing a adaptive serial and parallel mixed interference cancellation method for increasing performance and capacity of the CDMA system.

9 Claims, 9 Drawing Sheets

ADAPTIVE SERIAL AND PARALLEL MIXED INTERFERENCE CANCELLATION METHOD

BACKGROUND OF THE INVENTION

1. Field of the Invention

The present invention relates to a Code Division Multiple Access (CDMA) system, and more particularly to an adaptive serial and parallel mixed interference cancellation method for increasing performance and capacity of the CDMA system by reducing interference noises generated by multiple access.

2. Information Disclosure Statement

A CDMA system using a conventional method of detecting single user has a disadvantage of deteriorating performance and capacity of the CDMA system as a number of users increases, because it ignores interferences among a plurality of users in the multiple user environment. Recently, there are proposed serial interference cancellation and parallel interference cancellation methods each for reducing the interference noises generated by multiple access.

The conventional serial interference cancellation method has a disadvantage that any of detectors already used in interference cancellation process does not contribute to continued interference cancellation processes, and when a reality restricts a repetition number of said interference cancellation, the method also deteriorates the system performance by selecting only single user in an interference cancellation process.

The conventional parallel interference cancellation method has a disadvantage of deteriorating a system performance when the magnitude of the power of a received signal is widely distributed.

SUMMARY OF THE INVENTION

The present invention therefore provides solutions to the disadvantages. It is a object of the present invention to provide a adaptive serial and parallel mixed interference cancellation method for increasing performance and capacity of a CDMA system by cancelling an interference noise generated by multiple access in the CDMA system.

To achieve the object, the present invention includes steps of storing a received signal through a low pass filter into a buffer; receiving a signal from the buffer in a plurality of detectors; selecting one of decision signal from the plurality of detectors in a selection controller; closing a corresponding switch of the selected decision signal to provide a (+1,−1) binary data signal to a processor; recovering said (+1,−1) binary data signal provided to said processor; reproducing the baseband signal of the recovered signal at the same time of said recovering to remove the baseband signal of the recovered signal from said received signal; and adding said reproduced baseband signal to signal removed the baseband signal of recovered signal from said received signal by feeding said reproduced baseband signal to adders via feedback loops to thereby produce new signals.

In the adaptive serial and parallel mixed interference cancellation method in accordance with the present invention, reproduced baseband signals are fed back to respective input of detectors through the feedback loops, respectively, to thereby the reproduced baseband signals are added to signal removed the reproduced baseband signals from the received signal from users. Therefore, the estimated value of each detector is update on the basis of new input signal in which partial interference noise component is removed. The detectors which participated in interference cancellation process also continue to contribute to the interference cancellation processes using the updated evaluation values, being different from a disclosed serial interference cancellation method. The detectors which participated in interference cancellation process update their decision values based on the current input whose interferences are cancelled, even during the currently selected detectors continue a normal interference cancellation as in the serial interference cancellation method. The detectors to contribute to current interference cancellation process can be also selected group by group. Thus, this prevent the system performance from deterioration caused by selecting one user in an interference cancellation process, which is serial interference cancellation method, when a reality restricts a repetition number of an interference cancellation.

In the adaptive serial and parallel mixed interference cancellation method according to the present invention, being different from parallel interference cancellation method, there are provided an improved interference cancellation performance by blocking the signal detectors of users; having low output powers from contributing to the interference cancellation process, wherein the blocking is achieved by closing only the switches of the detectors selected for the current interference cancellation process and for the previous interference cancellation process. With one stage hardware, the adaptive serial and parallel mixed interference cancellation method can continue to cancel the interference noises using the disclosed parallel interference cancellation method, after selecting total users in interference cancellation process. From this, it is appreciated that the complexity of the hardware required by the adaptive serial and parallel mixed interference cancellation method according to the present invention can be reduced advantageously, compared to the parallel interference cancellation method mentioned above.

And, the adaptive serial and parallel mixed interference cancellation method applied to the CDMA receiver according to the present invention improves CDMA system performance and capacity by overcoming disadvantages of conventional CDMA system receivers using the serial and parallel interference cancellation methods mentioned above, as well as a conventional CDMA system receiver using a method of detecting single user.

BRIEF DESCRIPTION OF THE DRAWINGS

The present invention will be more clearly understood from the description as set forth below, with reference to the accompanying drawings, wherein.

DETAILED DESCRIPTION OF THE PREFERRED EMBODIMENTS

I. BPSG system to which the present invention is applied

Figure 1:
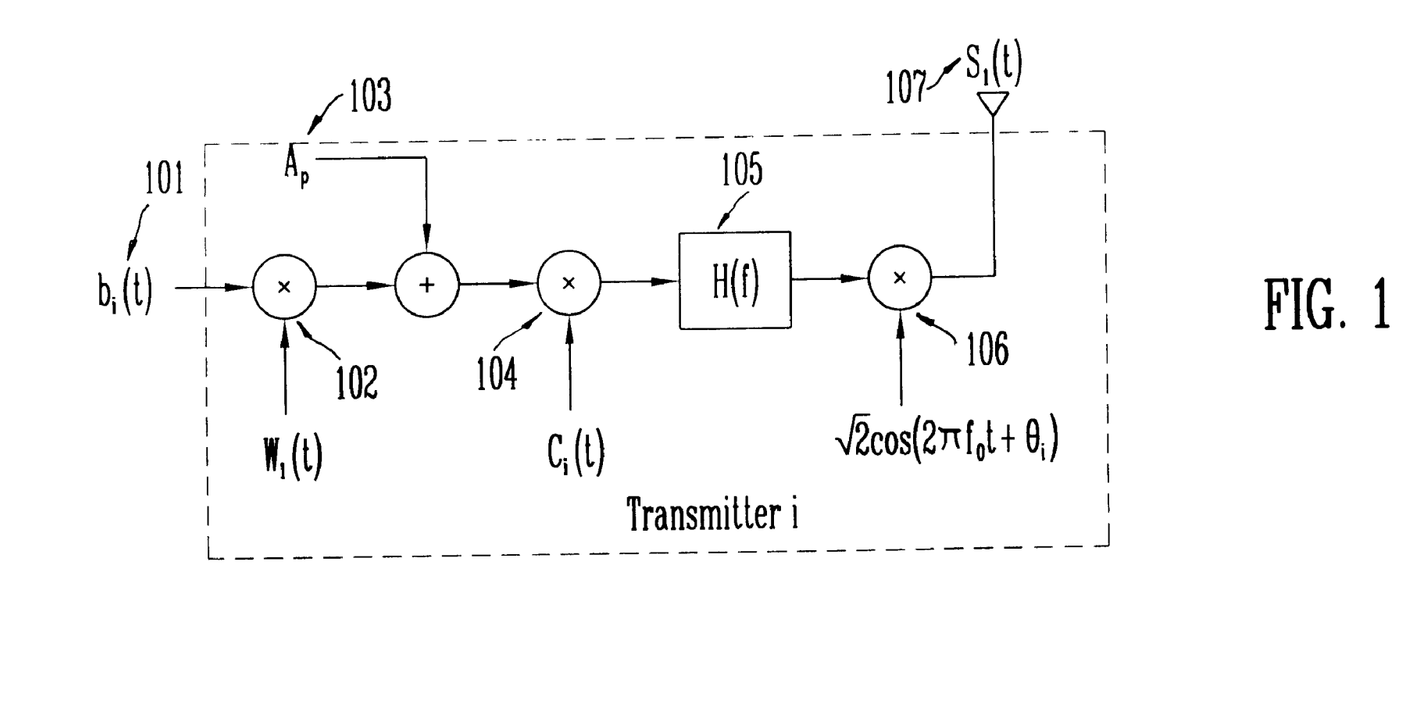
FIG. 1 is a structural view illustrating an arrangement of a synchronous BPSK transmitter in accordance with the present invention.

In FIG. 1, which illustrates an arrangement of a synchronous Binary Phase Shift Keying(BPSK) transmitter in accordance with the present invention, reference numeral 101 designates (+1,−1) binary data signal of i-th user in traffic channel, 102 designates a spreading caused by a Walsh code number 1, 103 is a signal amplitude of a pilot channel, 104 designates a spreading caused by a pseudo-random noise (PN), 105 designates a pulse shaping filter, 106 designates a frequency modulator using a carrier and 107 is a signal transmitted via an antenna.

In the synchronous BPSK transmitter of FIG. 1, the signal 107 the transmitted by the i-th user from the antenna can be defined equation 1 below:

$$Si(t)=\sqrt{2}[A_P+W_1(t)b_i(t)]c_i(t)\cos(2\pi f_0 t+\theta_i) \quad (1)$$

where $f_0$ is the carrier frequency and $\theta_i$ is the phase of the i-th user.

Figure 2:
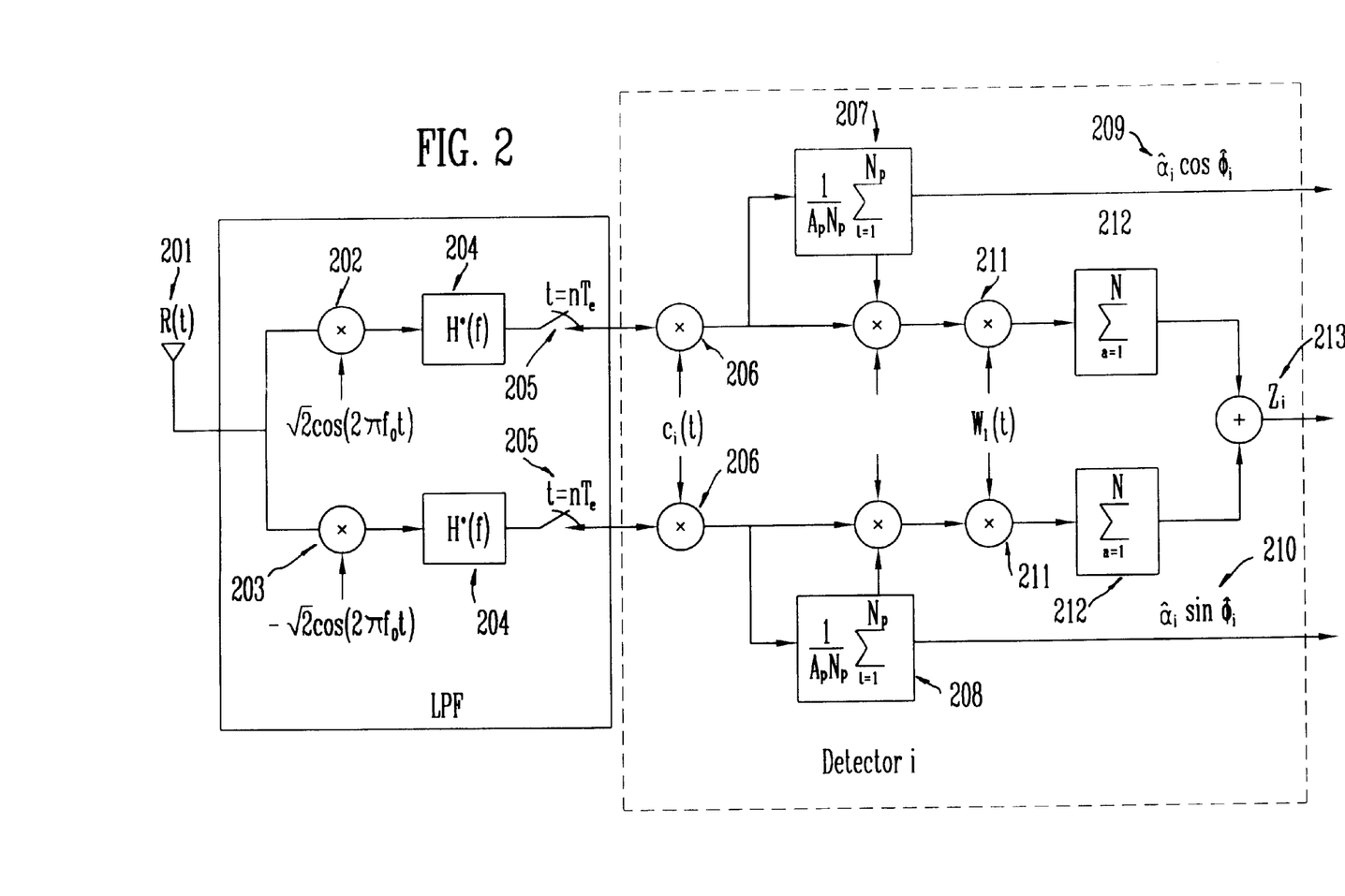
FIG. 2 is a structural view illustrating an arrangement of a synchronous BPSK receiver in accordance with the present invention.

In FIG. 2 which illustrates an arrangement of the synchronous BPSK receiver in accordance with the present invention, reference numeral 201 designates a received signal through the fading channel from the transmitter in FIG. 1; 202 and 203 designate frequency demodulators using carrier for the I and Q channels, respectively; 204 designate matched filters; 205 designate integer-multiple sampling for chip periods $T_c$; and 206 designate despreadings for PN codes of the i-th user; 207 and 208 designate amplitude and phase evaluators, respectively; 209 and 210 designate amplitude and phase estimated values obtained at the 207 and 208; 211 designate despreading determined by Walsh code number 1; 212 designate adders for effecting addition for N chip periods; and 213 designates a decision signal of the i-th user signal.

The received signal 201 which reflects the signal transmitted by a number of users including the i-th user and channel noise in the synchronous BPSG receiver of FIG. 2 is defined as follows:

$$R(t) = \sum_{i=1}^{K} \sqrt{2}\, \alpha_i [A_P + W_1(t-\tau_i)b_i(t-\tau_i)]c_i(t-\tau_i)\cos(2\pi f_0 t + \phi_i) + n(t) \quad (2)$$

Where K is the number of the users in service, $\alpha_i(t)$, $\phi_i(t)$ and $\tau_i(t)$ are the amplitude, phase and time delay of the channel response for the i-th user signal, respectively, and n(t) is the Additive White Gaussian Noise(AWGN).

The I channel signal in the baseband obtained from the despreading 206 is given as follows:

$$I_i(n)=\alpha_i[A_P+W_1(n)b_i(n)]\cos\phi_i+n_c(n) \quad (3)$$

And, the Q channel signal is given by the Equation below:

$$Q_i(n)=\alpha_i[A_P+W_1(n)b_i(n)]\sin\phi_i+n_s(n) \quad (4)$$

where $n_c(n)$ and $n_s(n)$ are noises including a white Gaussian Noise and a multiple access noise.

hannel parameter evaluation values 209 and 210 are obtained by averaging $I_i(n)$ and $Q_i(n)$ for $N_p$ chip periods. $N_p T_c$ is set to be within a time for which a channel characteristics is kept constant. $N_p$ sample is used on the assumption that channel parameters are kept constant for period of symbol to be detected. 209 and 210 can be represented by equations below, respectively:

$$\hat{\alpha}_i\cos\hat{\phi}_i = \frac{1}{A_P N_P} \sum_{K=n-N_P+1}^{n} I_i(K), \quad (5)$$

$$\hat{\alpha}_i\sin\hat{\phi}_i = \frac{1}{A_P N_P} \sum_{K=n-N_P+1}^{n} Q_i(K) \quad (6)$$

II. CDMA system using a conventional method of detecting single user

Figure 3:
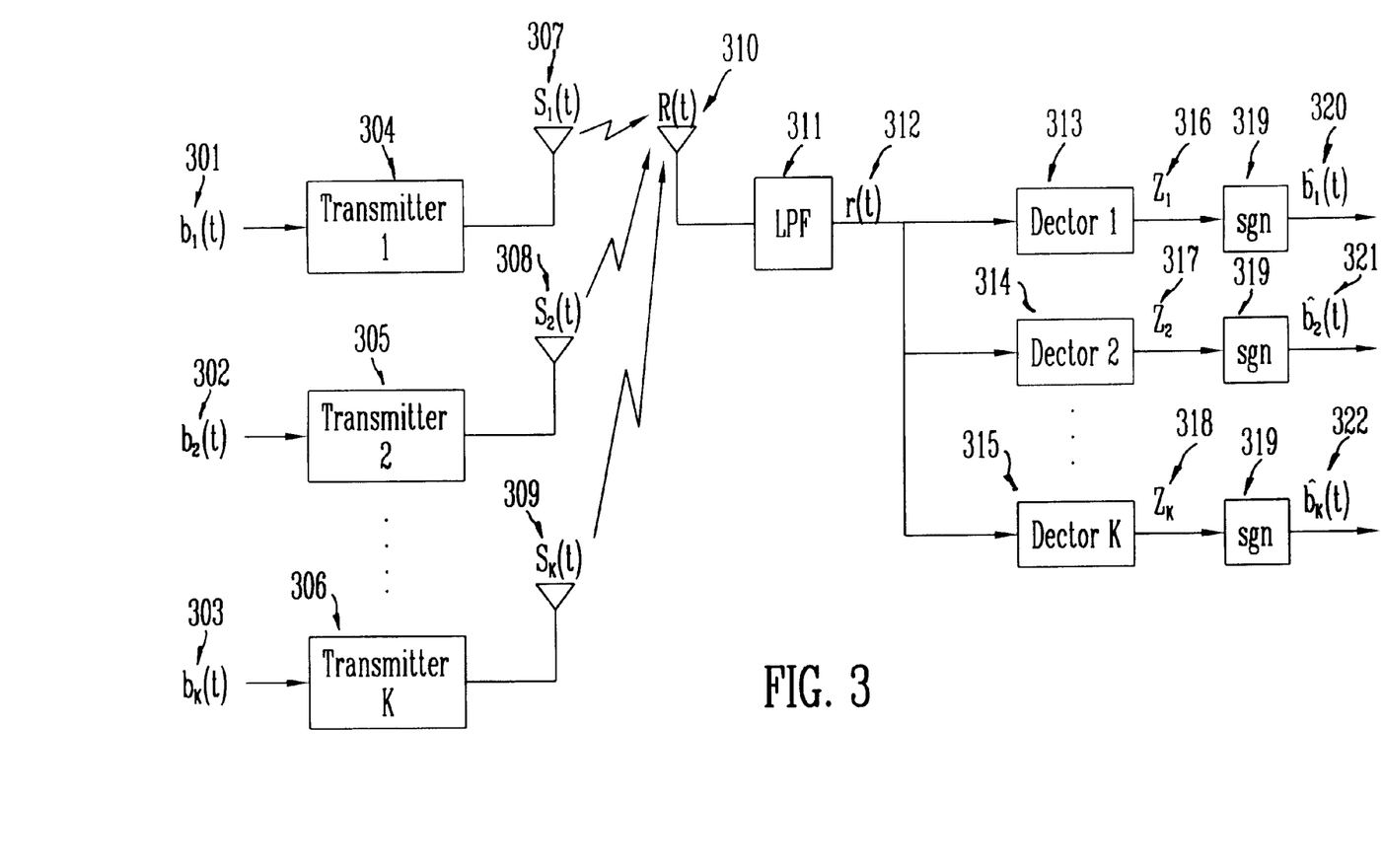
FIG. 3 is a structural view illustrating an arrangement of a CDMA system using a conventional single user detection method.

In FIG. 3, which illustrates an arrangement of a BPSK system using a conventional method of detecting single user, reference numeral 301, 302 and 303 designate (+1,−1) binary data signals of a first, a second and a K-th users in communication channels, respectively; 304, 305 and 306 designate the respective transmitters of the first, the second and the K-th users corresponding to the broken line box of FIG. 1; and 307, 308 and 309 designate respective signals of the first, the second and the K-th users transmitted via their antennas. 310 designates a received signal through fading channel; 311 designates a frequency demodulator using a carrier and matched filter which corresponds to the solid line box of FIG. 2; 312 is a baseband signal; 313, 314 and 315 designate respective detectors of the first, the second and the K-th users which correspond to the broken line box of FIG. 2; 316, 317 and 318 designate respective decision signals of the first, the second and the K-th users; 319 are sgn functions; and 320, 321 and 322 designate respective estimation values of (+1,−1) binary data signals of the first, the second and the K-th users in the traffic channels.

The sgn function 319 represents the signum function defined as equation 7 below:

$$\text{sgn}(t) = \begin{cases} 1 & (t>0) \\ -1 & (t<0) \end{cases} \quad (7)$$

The received baseband signal 312 in FIG. 3 is a complex valued function given by equation 8 below:

$$r(t) = \sum_{i=1}^{K} \alpha_i e^{j\phi_i}[A_P + W_1(t-\tau_i)b_i(t-\tau_i)]c_i(t-\tau_i) + n(t) \quad (8)$$

On the assumption that the signal of the first user will be recovered, if the received baseband signal 312 is divided into the signals of the first and other users, the baseband signal 312 is given by equation below:

$$r(t) = \alpha_1 e^{j\phi_1}[A_P + W_1(t-\tau_1)b_1(t-\tau_1)]c_1(t-\tau_1) + \sum_{i=2}^{K} \alpha_i e^{j\phi_i}[A_P + W_1(t-\tau_i)b_i(t-\tau_i)]c_i(t-\tau_i) + n(t) \quad (9)$$

In equation 9, the first term designates the signal of the first user, the second term designates the interference noise coused by the multiple access with which 2~Kth user signals adversely affect the recovery of the signal of the first user, and the third term designates a White Gaussian Noise. From the second term, it can be well appreciated that the other users signal as the user increase contribute to increasing the interference noise recovery of first user signal(as K become large).

The conventional method of detecting single user has a disadvantage of deteriorating performance and capacity of the CDMA system as a number of users increase, because it ignores the interference among a plurality of users in multiple user traffic environments. A typical interference cancellation method increases the capacity of the CDMA system by reducing interference noises in traffic.

Next, disadvantages of the CDMA system rising the serial and parallel interference cancellation methods, and the CDMA system using the adaptive serial and parallel mixed interference cancellation method in accordance with the present invention which has overcome the disadvantages will be explained with reference to accompanying drawings.

III. CDMA system receiver using the serial interference cancellation method.

For reference, X of representation $X_i^j$ designates a corresponding signal, j designates the number of interference cancellations, and i designates a user, respectively.

Figure 4A:
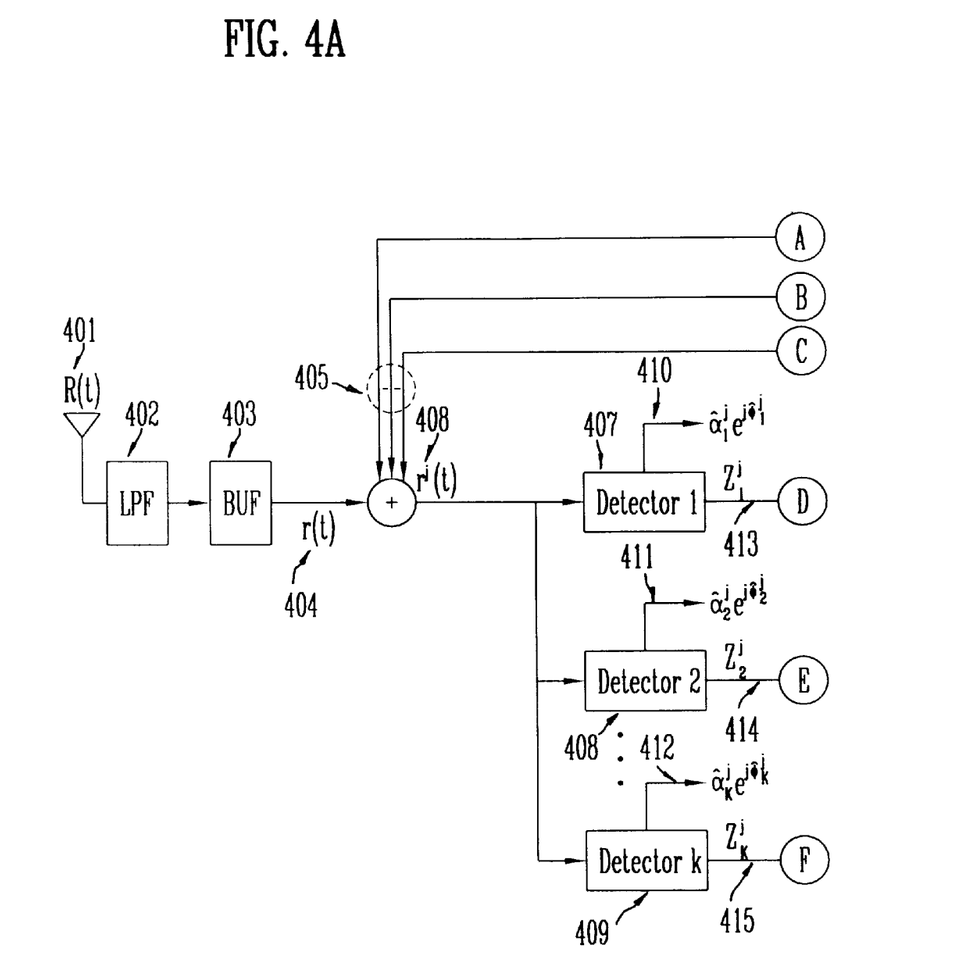
FIG. 4 is a structural view illustrating an arrangement of a receiver of a CDMA system using a conventional serial interference cancellation method.
Figure 4B:
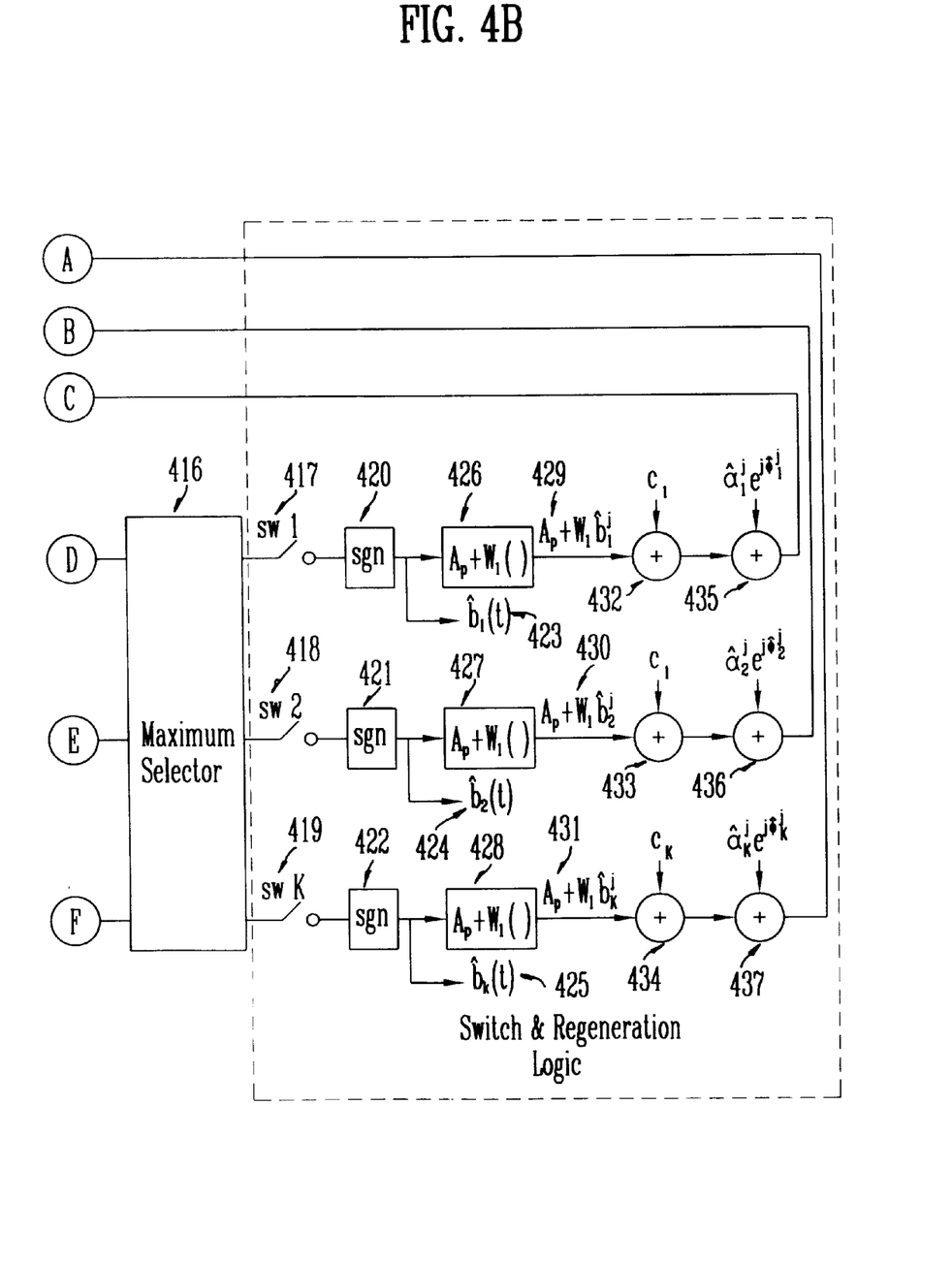

FIG. 4 is a view illuminating an arrangement of a CDMA receiver using a conventional serial interference cancellation method. In FIG. 4, 401 designates a received signal through the fading channel from the transmitter; 402 designates a frequency demodulator using a carrier and matched filter, which corresponds to the solid line box of FIG. 2; 403 is a buffer; 404 is a baseband signal; 405 is a subtracter; 406 designates a baseband signal obtained after interference cancellation process is performed j times; 407, 408 and 409 designate respective detectors of the first, the second and the K-th users which correspond to the broken line box of FIG. 2; and 410, 411 and 412 designate respective estimation values of the first, the second and the K-th users corresponding to the estimation values of 209 and 210 in FIG. 2. 413, 414 and 415 designate respective decision signals of the first, the second and the K-th users; 416 designates a maximum selector; 417, 418 and 419 designate respective switches of the first, the second and the K-th users; 420, 421 and 422 designate respective sgn functions; 423, 424 and 425 designate respective estimation values of (+1,-1) binary data signals of the first, the second and the K-th users in the traffic channel; and 426, 427 and 428 designate respective processors for adding the signal amplitude of the pilot channel to the resultant values from multiplications of each Walsh code number 1 by the estimation values of (+1,-1) signals of the first, the second and the K-th users. 429, 430 and 431 designate respective output signals from 426, 427 and 428; 432, 433 and 434 designate despreadings by PN codes for signals from 429, 430 and 431, respectively; and 435, 436 and 437 designate respective multipliers for multiplying by estimation values of amplitude and phase.

On the assumption that the order of the magnitude of the received powers equals to the order of the users 1~K, an operation of the CDMA receiver using the serial interference cancellation method in FIG. 4 is as follows.

The received signal 401 is stored into the buffer 403 through the low pass filter 402. The maximum selector 416 selects one with maximum power from the decision signals output by the respective detectors 407, 408 and 409. The maximum selector 416 closes only the corresponding switch 417 of the selected signal, and recovers the transmitted (+1,-1) binary data signal 423 using the sgn function 420. The baseband signal of the recovered signal 423 is reproduced in 426, 429, 432 and 435 at the same time of the recovering, based on the recovered signal 423, and then is removed(subtracted) from the received original signal 404 in 405. Thus, new signal 406 is generated, by removing the signal with the maximum power from the received original basebane signal 404.

The maximum selector 416 select the decision signal 414 with maximum power from the decision signals 414 and 415 output from respective detectors 408 and 409 by using the new signal 406. The maximum selector 416 closes only the corresponding switch 418 of the selected signal, and recovers the transmitted (+1,-1) binary data signal 424 using the sgn function 421. The baseband signal of the recovered signal 424 is reproduced in 427, 430, 433 and 436 at the same time of the recovering, based on the recovered signal 424, and then is removed(subtracted, from the received original signals 404 in 405. Thes new signal 406 is generated by removing the signal having the maximum power from the original received baseband signal 404 in 405.

The respective detectors continue to recover the transmitted signals using the new signals. These operations are repeated in order of the third to K-th users.

This method is for continuously eliminating the interference noises of users in order of the received powers, as mentioned above. The received baseband signal 406 is given by equation below:

$$r(t) = \sum_{i=1}^{K} a_i e^{j\phi_i} [A_P + W_1(t - \tau_i)b_i(t - \tau_i)c_i(t - \tau_i) + n(t) \quad (10)$$

On the assumption that i represents the order of the received powers, after completing j-th interference cancellation process the input signal from (j+1)th user to the receiver can be represented by equation below:

$$r_{j+1}^j(t) = r(t) - \sum_{i=1}^{K} \hat{a}_i^j e^{j\hat{\phi}_i^j} [A_P + W_1(t - \tau_i)\hat{b}_i^j(t - \tau_i)]c_i(t - \tau_i) \quad (11)$$

In the serial interference cancellation method, the estimation values $\hat{a}_i^i$, $\hat{\phi}_i^i$ and $\hat{b}_i^i$ for the i-th user are determined based on the $r_i^{i-1}(t)$ obtained after completing (i-1)th interference cancellation process.

In the serial interference cancellation method, each detectors 407, 408 and 409 belongs to one of the following three group. The group 1—the detectors selected previously do not effect any activities because they have their decision values. The group 2—the currently selected detector reproduces a baseband signal, which is eliminated from an input of the detector. The group 3—the detectors output their decision values and wait for selection. The serial interference cancellation method disclosed here has two disadvantages as follows. A first disadvantage is that the detectors selected previously do not contribute to the next interference cancellation process. Consider one detector having maximum power. This detector is selected first, reproducing a corresponding user signal. A desired signal may be not exactly reproduced because a decision value and a channel parameter are obtained from the received signal including a substantial interference noises due to other user signals, and this incompletely reproduced signal affects subsequent interference cancellation process. The detectors of the group 1 also can not update their decision values, and therefore the system performance decreases. A second disadvantage is related to an actual implementation for the system. In this serial interference cancellation method, when it is impossible to process the sequential interference cancellation for all users in reality as the number of users to be eliminated increases, there can exist one alternative that the number of users to be eliminated is limited on the sacrifice of the system performance. Then, it may be not the best way that one interference cancellation process selects only one user, which is the serial interference cancellation method.

VI. CDMA system receiver using the parallel interference cancellation method

Figure 5A:
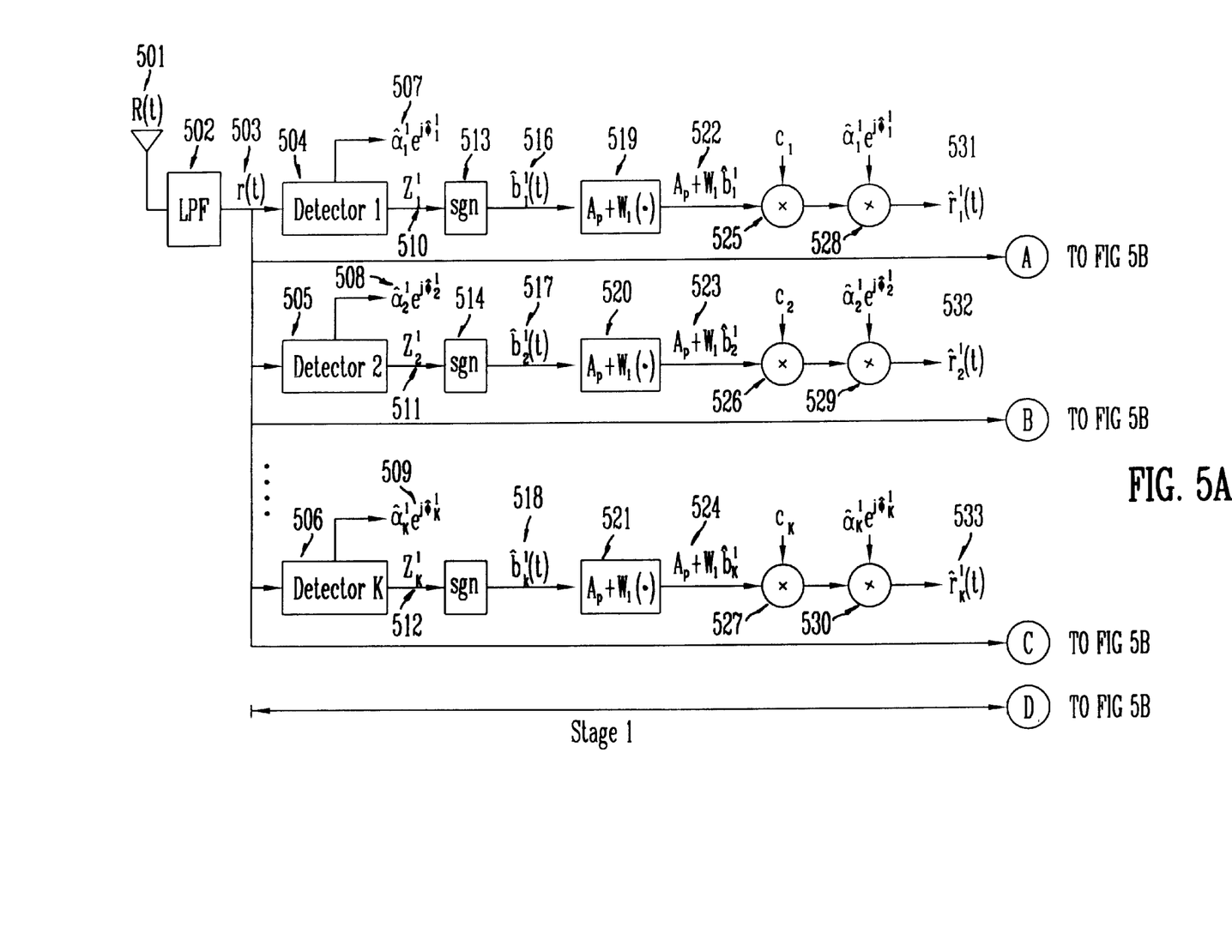
FIG. 5 is a structural view illustrating an arrangement of a receiver of a CDMA system using a conventional parallel interference cancellation method.
Figure 5B:
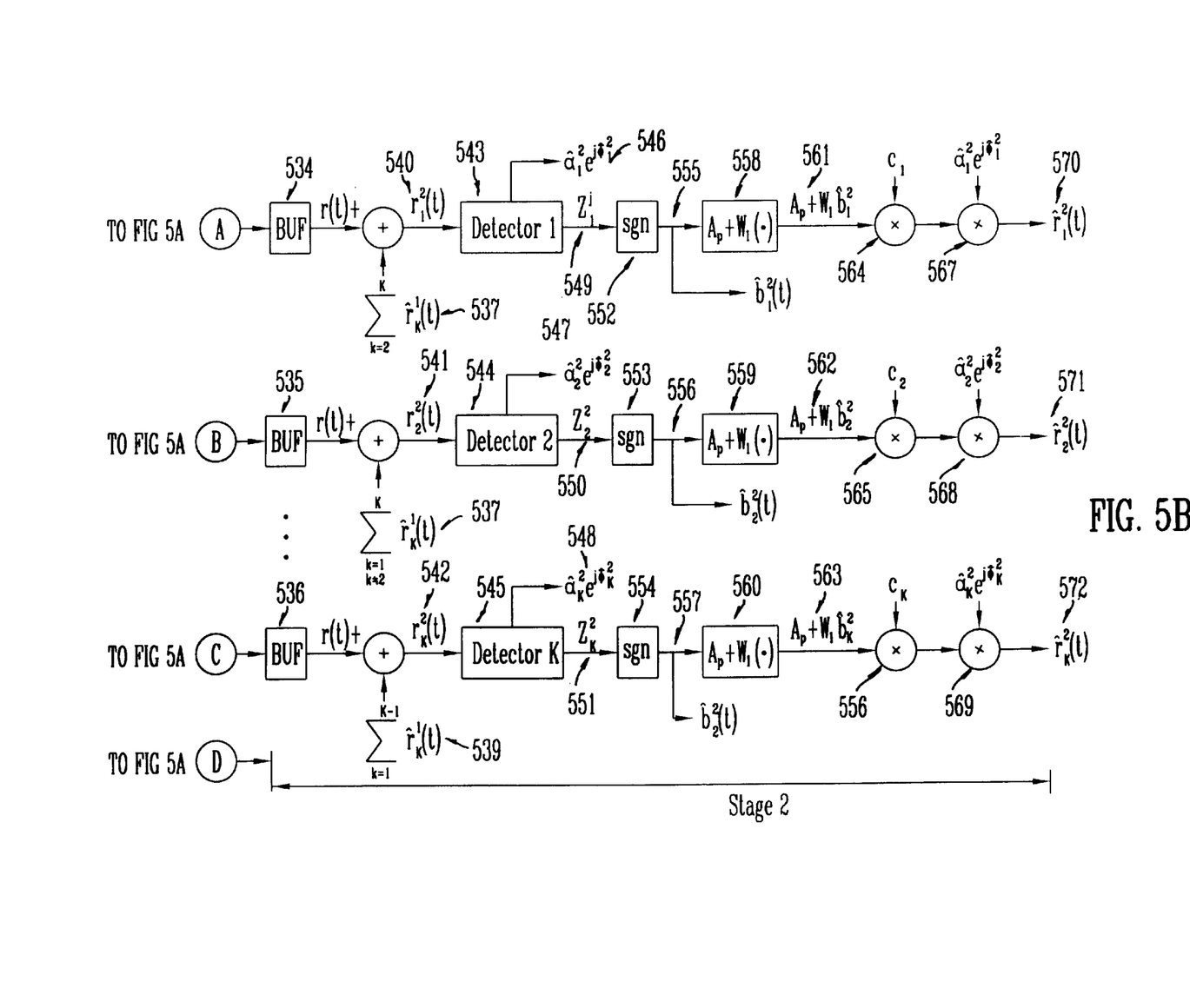

FIG. 5 is a view illuminating an arrangement of a CDMA receiver using a conventional parallel interference cancellation method. In FIG. 5, 501 designates a received signal through the fading channel from the transmitter; 502 designates a frequency demodulator using a carrier and matched filter, which corresponds to the solid line box of FIG. 2; 503 is a baseband signal; 504, 505 and 506 designate detectors of the first, the second and the K-th users which correspond to the broken line box of FIG. 2, respectively; and 507, 508 and 509 designate respective estimation values of the first, the second and the K-th users corresponding to the estimation values of 209 and 210 in FIG. 2. 510, 511 and 512 designate decision signals of the first, the second and the K-th users; 513, 514 and 515 designate respective sgn functions; 516, 517 and 518 designate respective estimation values of (+1,−1) binary data signals of the first, the second and the K-th users in the traffic channel; and 519, 520 and 521 designate respective processors for adding the signal amplitude of the pilot channel to the resultant values from multiplication of each Walsh code number 1 by the estimation values of (+1,−1) binary data signals of the first, the second and the K-th users. 522, 523 and 524 designate output signal from the 519, 520, 521, respectively; 525, 526 and 527 designate despreadings by PN codes for signals from 522, 523 and 524; and 528, 529 and 530 designate respective multipliers for multiplying by estimation value of amplitude and phase. 531, 532 and 533 designate respective baseband signal estimation values of the first, the second and the K-th users; 534, 535 and 536 are buffers; 537, 538 and 539 designate the summations of baseband signal estimation values of users other than desired users; and 540, 541 and 542 designate respective baseband signals obtained after effecting interference cancellation one time.

543, 544 and 545 designate respective detectors of the first, the second and the K-th users which correspond to the broken line box of FIG. 2; and 546, 547 and 548 designate estimation values of the first, the second and the K-th users corresponding to the estimation values of 209 and 210 in FIG. 2, respectively. 549, 550 and 551 designate respective decision signals of the first, the second and the K-th users; 552, 553 and 554 designate respective sgn functions; 555, 556 and 557 designate respective estimation values of (+1,−1) binary data signals of the first, the second and the K-th users in the traffic channel; and 558, 559 and 560 designate respective processors for adding the signal amplitude of the pilot channel to the resultant value from multiplication of each Walsh code number 1 by the estimation values of (+1,−1) binary data signals of the first, the second and the K-th users. 561, 562 and 563 designate respective output signals from the 558, 559, 560; 564, 565 and 566 despreadings by PN code for signals from 561, 562 and 563, respectively; 567, 568 and 569 designate multipliers for multiplying by estimation values of amplitude and phase. 570, 571, 572 designate respective baseband signals estimation values of the first, the second and the K-th users.

An operation of the CDMA system receiver using the parallel interference cancellation method in FIG. 5 is as follows:

The received signal 501 becomes a baseband signal 503 via the low pass filter 502. This baseband signal 503 is stored in the buffer 534, 535, 536. The decision signals output by the respective detectors 504, 505 and 506 recover the transmitted (+1,−1) binary data signals 516, 517 and 518 using the sgn functions 513, 514 and 515. The baseband signals 531, 532 and 533 of the recovered signals 516, 517 and 518 are reproduced in 519, 520, 512 and 522 to 530 at the same time of the recovering, based on the recovered signals 516, 517 and 518. Therefore, reproduced signals 537, 538 and 539 for all users other than the desired user are eliminated(subtracted) from the received original signals stored in the buffer, producing new signals 540, 541 and 542 having only the signals for the desired user.

In the next step, the decision signals 549, 550 and 551 output from respective detectors 543, 544 and 545 to recover the transmitted (+1,−1) binary data signals 555, 556 and 557 via the sgn function 552, 553 and 554 by using. The baseband signals 570, 571 and 572 of the recovered signals 555, 556 and 557 are reproduced in 558 to 569 at the same time of the recovering, based on the recovered signals 555, 556 and 557. The parallel interference cancellation method repeats said operation upto arbitrary step.

In the parallel interference cancellation method, all user signals other than desired user signals are eliminated in every step, being different from the serial interference cancellation method. That is, the current estimation values are determined based on previous values to reproduce other user signals. This operation is repeated to arbitrary step. In case where the received signals have different powers, the parallel interference cancellation method may be inferior to the serial interference cancellation method. This is because the detectors of the users having low powers contribute to interference cancellation with wrong channel parameters and estimation values for bit decision, and reproduce the signal. In case of wide power distribution as in a multiple path environment, such a reduction in performance is apparent. Although the parallel interference cancellation method does not require high speed hardware processing, it requires multi-stage hardware having the same structures, increasing complexity of the hardware. In the parallel interference cancellation method, the input to the detector for K-th user after the j-th interference cancellation process is given by equation below:

$$r_K^j(t) = \qquad (12)$$

$$r(t) - \sum_{i=1, i=K}^{K} \hat{\alpha}_i^j e^{j\hat{\phi}_i^j} \left[ A_P + W_1(t - \tau_i)\hat{b}_i^j(t - \tau_i) \right] c_i(t - \tau_i)$$

Where, the evaluation values $\hat{\alpha}_i^j$ and $\hat{\phi}_i^j$ for the i-th user are derived by receiving the signal $r_i^{j-1}(t)$ obtained after effecting the (j−1)th interference cancellation process.

Figure 6A:
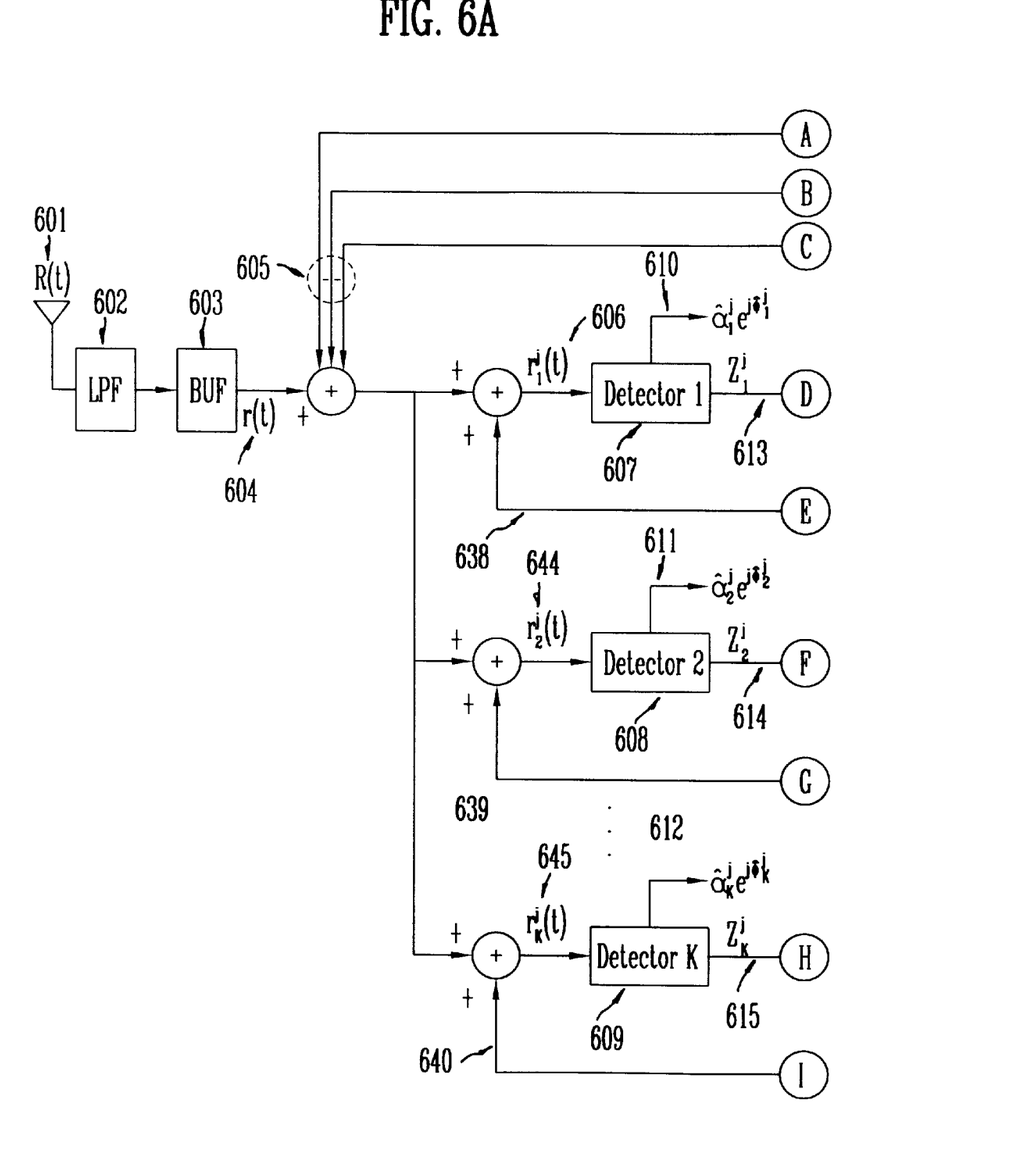
FIG. 6 is a structural view illustrating an arrangement of a receiver of a CDMA system using an adaptive serial and parallel mixed interference cancellation method in accordance with the present invention.
Figure 6B:
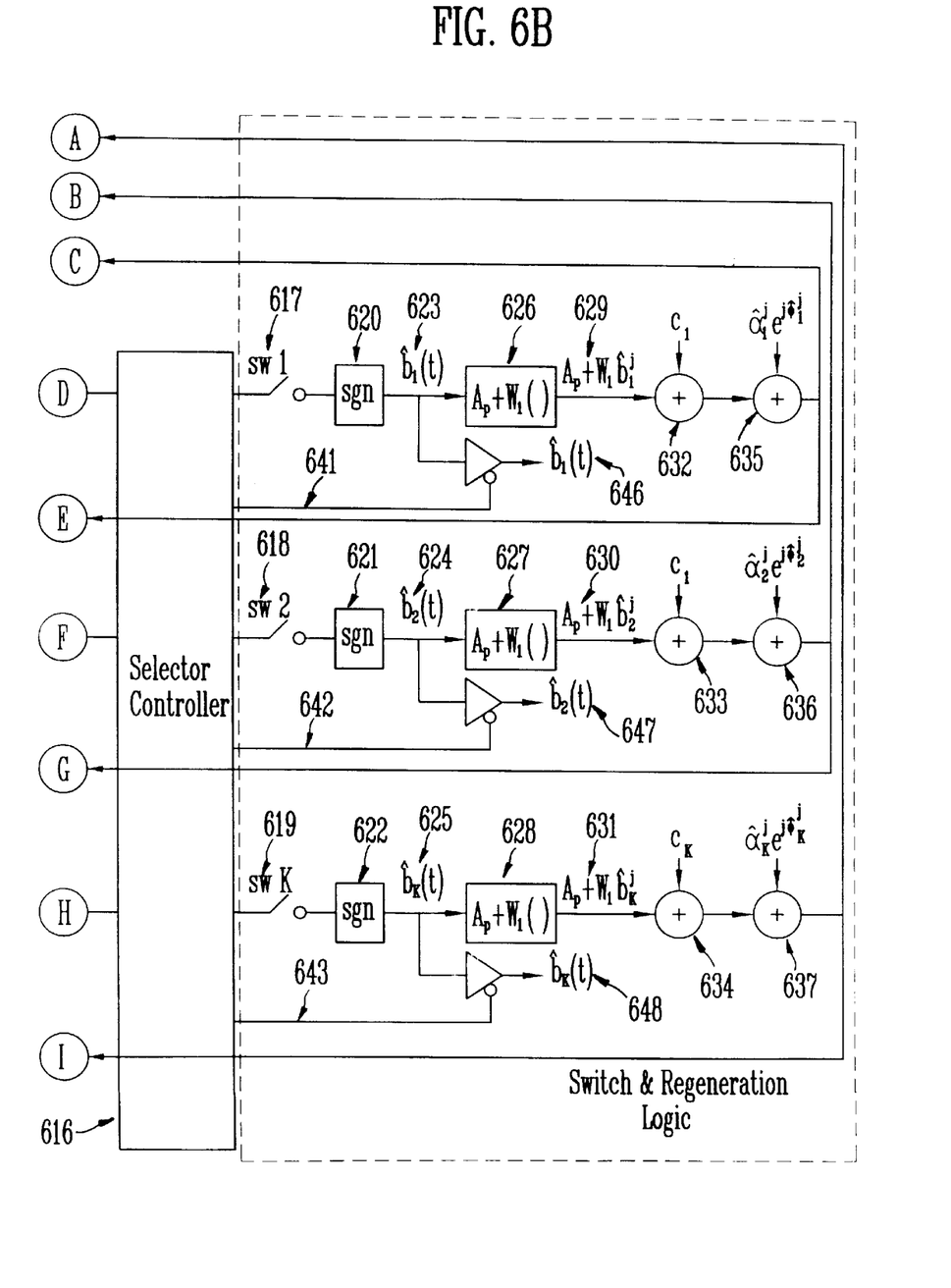

V. CDMA system receiver using the adaptive serial and parallel mixed interference cancellation method in accordance with the present invention FIG. 6 is a view illustrating an arrangement of a CDMA system receiver using the adaptive serial and parallel mixed interference cancellation method in accordance with the present invention. In FIG. 6, 601 designates a received signal through the fading channel from the transmitter; 602 designates a frequency demodulator using a carrier and matched filter, which corresponds to the solid line box of FIG. 2; 603 is a buffer, 604 is a baseband signal; 605 is a subtracter; 606 designates a baseband signal obtained after interference cancellation is performed j times; 607, 608 and 609 designate detectors of the first, the second and the K-th users which correspond to the broken line box of FIG. 2, respectively; and 610, 611 and 612 designate respective estimation values of the first, the second and the K-th users corresponding to the estimation values of 209 and 210 in FIG. 2. 613, 614 and 615 designate decision signals of the first, the second and the K-th users; 616 designates a selection controller; 617, 618 and 619 designate respective switches of the first, the second and the K-th users; 620, 621 and 622 designate respective sgn functions; 623, 624 and 625 designate respective estimation values of (+1,−1) binary data signals of the first, the second and the K-th users in the traffic channel; and 626, 627 and 628 designate respective processors for adding the signal amplitude of the pilot channel to the resultant values from multiplication of each Walsh code number 1 by the estimation values of (+1,−1) signals of the first, the second and the K-th users. 629, 630 and 631 designate output signals from 626, 627, 628, respectively; 632, 633 and 634 designate respective despreadings by PN codes for signals from 629, 630 and 631; 635, 636 and 637 designate respective multipliers for multiplying by estimation values of amplitude and phase; 638, 639 and 640 designate respective feedback loops through which 635, 636, and 637 are added to the baseband signals; and 641, 642 and 643 designate respective signals for controlling the evaluation values 623, 624 and 625.

An operation of the CDMA receiver using the adaptive serial and parallel mixed interference cancellation method in accordance with the present invention is as follows:

The received signal 601 is stored into the buffer 603 through the low pass filter 602. The selection controller 616 selects some of the decision signals from the decision signals output by respective detectors 607, 608 and 609, based on received power distribution and processing speed. The selection controller 616 closes the corresponding switches 617, 618 and 619 of the selected signals, and recovers the transmitted (+1,−1) binary data signals 623, 624 and 625 using the sgn functions 620, 621 and 622. The baseband signals of the recovered signals are reproduced in 626 to 637 at the same time of the recovering, then are eliminated from the received original signals in 605 and are fed back through the feedback loops 638, 639 and 640 into the inputs of the detectors to add to signal removed the reproduced baseband signal from the received original signal, resulting in the new signals 606, 644 and 645. Thus, to recover the transmitted (+1,−1) binary data signals 623, 624 and 625, the CDMA system using the adaptive serial and parallel mixed interference cancellation method controls the outputs of the system using the control signals 641, 642 and 643, being different from a CDMA system using the serial interference cancellation method. This operation is for recovering the transmitted (+1,−1) binary data signals 646, 647 and 648, after effecting interference cancellation process many times.

In the adaptive serial and parallel mixed interference cancellation method in accordance with the present invention, the input signal from the K-th user to the detectors after the j-th interference cancellation is represented by the equation below:

$$r_K^j(t) = r(t) - \sum_{i=1, i \neq K}^{s(j)} \hat{\alpha}_i^j e^{j\hat{\phi}_i^j}\left[A_P + W_1(t-\tau_i)\hat{b}_i^j(t-\tau_i)\right]c_i(t-\tau_i) \quad (13)$$

$$\text{where, } s(j) = \begin{cases} \sum_{i=1}^{j} B(i), & s(j) \leq K \\ K, & \text{otherwise} \end{cases}$$

Thus, the estimation values $\hat{\alpha}_i^j$ and $\hat{\phi}_j^i$ are derived by receiving the signals obtained after effecting the (j−1)th interference cancellation process.

In the adaptive serial and parallel mixed interference cancellation method, the reproduced baseband signals 635, 636 and 637 are fed back to respective inputs of the detectors 607, 608 and 609 through the feedback loops 638, 639 and 640, respectively, whereby the estimation values of the detectors are updated on the basis of the new signals 606, 644 and 645 whose partial interference noises are cancelled. In addition, the detectors of group 1 continue to contribute to the interference cancellation process using the updated estimation values, bring different from serial interference cancellation method. The detectors of group 1 update in each process their decision signals based on the current reproduced signals whose interference are cancelled, even during the currently selected detectors continue a normal interference cancellation as in the serial interference cancellation method. With this operation, there is no increase in time to cancel the interference noise. The repetition number of interference cancellation is restricted by the time taken to cancel the interference.

In the adaptive serial and parallel mixed interference an improved interference cancellation performance by blocking the signal detectors of the users having low output power from contributing to the interference cancellation in progress, wherein the blocking is achieved by putting the switches 617, 618 and 619 on, following only the detectors selected for the interference cancellation in progress and for the previous interference cancellation. With one stage hardware, the adaptive serial and parallel mixed interference cancellation method according to the present invention continues to cancel the interference using the parallel interference cancellation method. From this, it is appreciated that the complexity of the hardware required by the adaptive serial and parallel mixed interference cancellation method according to the present invention is reduced advantageously, compared to the parallel interference cancellation method.

There is further difference between the adaptive serial and parallel mixed interference cancellation method and the serial interference cancellation method in that the detectors contributing to interference cancellation can be selected group by group. The number of detectors of each group ranges from one to the number of the total users. In the adaptive serial and parallel mixed interference cancellation method according to the present invention, the group of users having large output power is processed in single interference cancellation step, as in the single user processing of the serial interference cancellation method, decreasing the time taken to process over the serial interference cancellation method. The number B(i) of the detectors selected in the i-th interference cancellation and the total number of the interference cancellations is determined by the total number of users in service, the processing speed of hardware and the received power of the signal. There are two extreme cases in selecting the B(i). That is, when B(i) equals to 1, the present invention becomes to an adaptive enhanced serial interference cancellation(AESIC) having performance over serial interference cancellation method, while when B(i) equals to K the present invention becomes to an adaptive recursive interference cancellation(ARIC) having the better performance than that of the parallel interference cancellation method and a reduced hardware complexity.

The demodulation device determines a priority based on a power estimation value to select the user hiving maximum power. The present invention contemplates an interference cancellation in time-varying radio communication environments and utilizes coherent demodulation. A coherent reception requires estismating channel characteristics, i.e., channel parameters such as a time-varying amplitude and a phase. A method of estimating the channel parameter is to transmit a separated pilot signal for each user. The pilot power is set so that it has lower than that of data signal power. The receiver estimates the channel amplitude and phase using the pilot signal without information for channel conditions in advance. The word 'adaptive' means such an estimation in proposed interference cancellation according to the present invention.

As described above, the CDMA system receiver using the adaptive serial and parallel mixed interference cancellation method according to the present invention has performance over a CDMA system receivers using serial and parallel interference cancellation methods, as well as a CDMA system receiver using a method of detecting only single user, and has enough increased system capacity to accommodate more users.

What is claimed is:

1. An adaptive serial and parallel mixed interference cancellation method, comprising the steps of:

storing a received signal in a buffer via a low pass filter;

receiving a buffer signal output from said buffer at a plurality of detectors;

selecting arbitrary ones of decision signals output from the plurality of detectors in a selection controller;

closing a switch corresponding to a selected signal selected in said selection controller and transmitting said selected signal with a (+1,−1) binary data signal through a signum function to a processor;

recovering said (+1,−1) binary data signal at said processor;

reproducing a baseband signal of the recovered signal during said step of; and feeding the reproduced baseband signal to an address via feedback loops and adding said reproduced baseband signal at an adder to remove the reproduced baseband signal from the received signal to thereby produce new signals.

2. The adaptive serial and parallel mixed interference cancellation method of claim 1, further comprising the steps of selecting detectors by one of group by group and one by one, thereby attributing to the interference cancellation process in progress.

3. The adaptive serial and parallel mixed interference cancellation method of claim 1, wherein said step of recovering said (+1,−1) binary data signal comprises recovering said (+1,−1) binary data signal using a control signal.

4. The adaptive serial and parallel mixed interference cancellation method of claim 1, further comprising the steps of updating estimation values of said detectors based on the reproduced signal and the new signals whose interference noise components are cancelled.

5. The adaptive serial and parallel mixed interference cancellation method of claim 4, further comprising the steps of continuing to attribute the updated estimation values to the interference cancellation process and updating the decision values for each production of the new signals even during said steps of receiving a buffer signal and selecting arbitrary ones.

6. The adaptive serial and parallel mixed interference cancellation method of claim 1, wherein said selection controller selects arbitrary number of detectors, and the number of detector selected in said selection controller ranges from one to the total number of the users (K).

7. The adaptive serial and parallel mixed interference cancellation method of claim 1, wherein said closing switches closes the switch corresponding to the detectors selected at the current interference cancellation processing, and does not open them until the final bit decision is made after all the interference cancellation processes are accomplished.

8. The adaptive serial and parallel mixed interference cancellation method of claim 1, wherein said recursive parallel interference cancellation can be accomplished with one stage hardware when the number of detector selected in the interference canceling processing equals to K.

9. An adaptive serial and parallel mixed interference cancellation method, comprising the steps of:

storing a received signal in a buffer via a low pass filter;

receiving a buffer signal output from said buffer at a plurality of detectors;

selecting arbitrary ones of decision signals output from the plurality of detectors in a selection controller;

closing a switch corresponding to a selected signal selected in said selection controller and transmitting said selected signal with a (+1,−1) binary data signal through a signum function to a processor;

recovering said (+1,−1) binary data signal at said processor;

reproducing a baseband signal of the recovered signal during said step of feeding the reproduced baseband signal to an address via teedback loops;

adding said reproduced baseband signal at an adder to remove the reproduced baseband signal from the received signal to thereby produce new signals;

updating estimation values of said detectors based on the reproduced signal and the new signals whose interference noise components are cancelled, wherein; and continuing to attribute the updated estimation values to the interference cancellation process and updating the decision values for each production of the new signals even during said steps of receiving a butter signal and selecting arbitrary ones.

* * * * *